(12) United States Patent
Shih et al.

(10) Patent No.: US 8,187,368 B2
(45) Date of Patent: May 29, 2012

(54) LOW POWER CONSUMING DESORPTION APPARATUS AND DEHUMIDIFIER USING THE SAME

(75) Inventors: Ming-Shiann Shih, Taoyuan County (TW); Yu-Li Lin, Chiayi (TW); Jau-Chyn Huang, Hsinchu (TW); Ting-Wei Huang, Hsinchu (TW); Yen-Hsun Chi, Taitung County (TW); Yo-Ming Chang, Kaohsiung County (TW); Ming-Shan Jeng, Taipei County (TW); Ya-Wen Chou, Tainan (TW)

(73) Assignee: Industrial Technology Research Institute, Hsin-Chu (TW)

( * ) Notice: Subject to any disclaimer, the term of this patent is extended or adjusted under 35 U.S.C. 154(b) by 489 days.

(21) Appl. No.: 12/549,789

(22) Filed: Aug. 28, 2009

(65) Prior Publication Data

US 2010/0175557 A1    Jul. 15, 2010

(30) Foreign Application Priority Data

Jan. 12, 2009 (TW) .............................. 98100903 A
Apr. 10, 2009 (TW) .............................. 98111986 A

(51) Int. Cl.
*B01D 53/02* (2006.01)
(52) U.S. Cl. ............... 96/143; 96/125; 95/113; 95/117; 95/148; 422/186.04
(58) Field of Classification Search ............ 95/113–115, 95/117, 130, 143, 148; 96/125, 134, 135, 96/143, 146; 62/271, 600, 617, 640; 422/186.04
See application file for complete search history.

(56) References Cited

U.S. PATENT DOCUMENTS

| | | | | | |
|---|---|---|---|---|---|
| 5,385,603 | A | * | 1/1995 | Sienack | 96/125 |
| 5,505,825 | A | * | 4/1996 | Gold et al. | 95/126 |
| 5,827,355 | A | * | 10/1998 | Wilson et al. | 95/114 |
| 5,912,423 | A | * | 6/1999 | Doughty et al. | 95/107 |
| 5,972,077 | A | * | 10/1999 | Judkins et al. | 95/136 |
| 6,454,834 | B1 | * | 9/2002 | Livingstone et al. | 95/11 |
| 7,251,945 | B2 | * | 8/2007 | Tongue | 62/93 |
| 7,316,106 | B2 | * | 1/2008 | Son | 60/295 |
| 8,043,414 | B2 | * | 10/2011 | Jeng et al. | 95/113 |
| 2002/0170429 | A1 | * | 11/2002 | Flippo et al. | 95/45 |

(Continued)

FOREIGN PATENT DOCUMENTS

JP         56026528         3/1981

(Continued)

OTHER PUBLICATIONS

Japan Patent Office, "Office Action", Jun. 14, 2011, Japan.

(Continued)

*Primary Examiner* — Robert J Hill, Jr.
*Assistant Examiner* — Christopher P Jones
(74) *Attorney, Agent, or Firm* — WPAT., P.C.; Justin King

(57) ABSTRACT

The present invention provides a low power consumption desorption apparatus, which utilizes a pair of electrodes coupled to an absorbing material to provide an electric current flowing through the absorbing material so as to desorb the substances absorbed within the absorbing material. By means of the desorption apparatus of the present invention, the absorbing material is able to enhance the desorbing efficiency and reducing power consumption during desorption. The present invention further provides a dehumidifier using the low power consumption desorption apparatus for providing a continuous dry air flow to desorb and regenerate the moisture from the absorbing material so that the dehumidifier is capable of removing moisture in the air repeatedly to reduce the humidity.

32 Claims, 12 Drawing Sheets

U.S. PATENT DOCUMENTS

| | | | |
|---|---|---|---|
| 2004/0187685 A1* | 9/2004 | Tatsuhara et al. | 95/148 |
| 2004/0219084 A1* | 11/2004 | Hall et al. | 423/235 |
| 2007/0028769 A1* | 2/2007 | Eplee et al. | 95/113 |

FOREIGN PATENT DOCUMENTS

| | | |
|---|---|---|
| JP | 01-159026 | 6/1989 |
| JP | 2000-329371 | 11/2000 |
| JP | 2003-329377 | 11/2003 |
| JP | 2005-211743 | 8/2005 |
| JP | 2006-071171 | 3/2006 |

OTHER PUBLICATIONS

CN Office Action issued on Nov. 15, 2011.

* cited by examiner

LOW POWER CONSUMING DESORPTION APPARATUS AND DEHUMIDIFIER USING THE SAME

FIELD OF THE INVENTION

The present invention generally relates to an environmental control technology and, more particularly, a low power consuming desorption apparatus and dehumidifier using the same wherein a voltage is applied across electrodes on both ends of a conductive material for desorption.

BACKGROUND OF THE INVENTION

Conventionally, the household dehumidifier uses a refrigerant compressor to condense the moisture in the air to achieve dehumidification. However, the use of refrigerant results in problems such as ozone layer depletion. Therefore, there is the need in developing a novel dehumidification technique without using refrigerant.

In rotary desiccant dehumidification, the refrigerant compressor is not required; instead, an absorbing material is used to absorb the moisture in the air and then electrical-thermal heater is used to heat up the gas flow through a regenerating area of the absorbing material to desorb the moisture. The high-temperature and high-moisture gas through the regenerating channels is introduced into a heat exchanger for condensation. The condensed moisture is then collected by a water collector to achieve household dehumidification. Since dehumidificaton achieved by the rotary dehumidifier using an absorbing material is temperature and humidity independent and refrigerant free, it is advantageous in low noise and low cost without using the compressor.

In the rotary desiccant dehumidifier 1, as shown in FIG. 1, a moist gas flow 90 flows through a heat exchanger 10 into an absorbing material 11 so that the absorbing material 11 is capable of absorbing the moisture in the gas flow 90. The dehumidified gas flow 92 is released by a dehumidifying blower 12 to achieve dehumidification. On the other hand, an electric heater 13 heats up the temperature of a circulating gas flow 91. The water molecules in the absorbing material 11 is vaporized and desorbed by the temperature difference between the high-temperature circulating gas flow 91 and the water molecules in the absorbing material 11. Then, the high-temperature high-moisture circulating gas flow 91 enters the heat exchanger 10 to perform heat transfer with the low-temperature moist gas flow 90 at the entrance of the dehumidifier 1. The high-temperature high-moisture gas in the heat exchanger 10 can be condensed into liquid-phase water 93, which is then collected and exhausted. The circulating gas flow 91 returns to the electric heater 13 to repeat the aforesaid processes to complete moisture desorption. The absorbing material 11, the electric heater 13 and the heat exchanger 10 are integrated to achieve the dehumidification as a dehumidifier 1.

The absorbing material in a rotary dehumidifier is mostly porous. For example, the porous structure can be honeycomb type or corrugate type. Dehumidification uses physical absorption to absorb water molecules in the air by micro pores of absorbent to produce dried air. The absorbing capability of the rotary dehumidifier depends on, for example, the type and the amount of the absorbent, the temperature and humidity of the incoming air, the thickness of the rotary dehumidifier, the surface area of the honeycomb, the speed of the gas flow through the rotary dehumidifier, and the rotational speed of the rotary dehumidifier. A regenerating circulating flow channel is required to desorb the absorbed moisture from the dehumidifier. Therefore, dehumidification-regeneration is achieved by continuous absorption and desorption. The referred regenerating flow channel starts from the interface between the electric heater 13 and the absorbing material 11 (rotary dehumidifier) through the heat exchanger 10 and ends at the inlet where the gas flow enters the electric heater 13. For the absorbing material 11 (rotary dehumidifier), the gas flow inlet is a regeneration area of the rotary dehumidifier and the gas flow outlet is on the regeneration area wheel before the high-temperature and high-humidity gas enters the heat exchanger. In a rotary dehumidifier system, after the high-temperature and high-humidity gas on the regeneration side enters the condenser, heat exchange takes place between the high-temperature and high-humidity gas and the low-temperature gas outside the pipeline. Therefore, the high-temperature high-moisture gas in the condenser can be condensed into liquid-phase water.

In conventional rotary desiccant dehumidification, an electric heater is used to heat up the gas flow on the regenerating area to increase the temperature of the regenerating air. The thermal desorption mechanism comprises two approaches. One is vaporization by heat exchange of the gas flow, wherein a temperature gradient occurs as the circulating gas flow is heated up and the moisture is vaporized and desorbed from the absorbing material by the energy generated during heat exchange. However, this approach costs high power consumption to achieve dehumidifying because it takes a long time for vaporization to generate high-temperature gas required during moisture desorption. The other approach is vaporization by thermal radiation, wherein high-temperature gas is obtained by conducting a current flowing through a heating wire in the heater. Thermal radiation enables the water molecules in the absorbing material to receive the heat to be vaporized to desorb from the absorbing material. Since the radiated heat is proportional to the surface temperature to the power of four and the surface temperature of the electric heater is higher than 400° C., the radiated heat is very high. Therefore, the moisture desorption effect is much more important than vaporization by heat exchange of the gas flow. Accordingly, in the aforesaid two approaches, conventional desorption approaches by heating up the circulating gas flow or thermally radiating the water molecules to achieve desorption inevitably lead to high power consumption since the radiated heat is mostly absorbed by the absorbing material. Moreover, the radiated heat increases the surface temperature of the absorbing material, which adversely affects the absorption of water molecules by the desiccative to reduce the dehumidifying performance. Therefore, in a rotary dehumidifier, the power consumption is high and dehumidification efficiency is reduced.

SUMMARY OF THE INVENTION

The present invention provides a low power consumption desorption apparatus using electrodes disposed on both ends of an absorbing material so as to conduct an electric current flowing through the absorbing material to raise the temperature and desorb a substance absorbed by the absorbing material since the attractive force between the absorbed molecules and the absorbing material may change under some circumstances. Moreover, a regenerating gas path can be provided in a region corresponding to the electrodes so that the gas flow passes through the absorbing material to enhance the desorption rate.

The present invention provides a dehumidifier, by applying an electric current through the absorbing material between two electrodes to absorb the moisture in the air to reduce the humidity. Since the dehumidifier produces a regenerating circulating gas flow that carries the desorbed moisture, the absorbing material is capable of performing desorption without heating up the gas so as to reduce power consumption.

In one embodiment, the present invention provides a low power consumption desorption apparatus, comprising: an absorbing material capable of absorbing at least a substance; a pair of electrodes coupled to both ends of the absorbing material, each of the electrodes comprising a plurality of sub-electrodes being insulated from one another; and a voltage supply coupled to the pair of electrodes and providing the pair of electrodes with a voltage so that the absorbing material is conductive to perform desorption.

In another embodiment, the present invention further provides a dehumidifier, comprising: a condenser capable of providing a circulating gas flow; an absorbing material capable of allowing a gas flow to pass through to absorb at least a substance in the gas flow; a regenerating portion coupled to the condenser and the absorbing material, the regenerating portion guiding the circulating gas flow to pass through the absorbing material and further comprising a pair of electrodes coupled to both ends of the absorbing material, each of the electrodes comprising a plurality of sub-electrodes being insulated from one another; a voltage supply coupled to the pair of electrodes and providing the pair of electrodes with a voltage so that the absorbing material is conductive to perform desorption.

BRIEF DESCRIPTION OF THE DRAWINGS

The objects, spirits and advantages of the embodiments of the present invention will be readily understood by the accompanying drawings and detailed descriptions, wherein.

DETAILED DESCRIPTION OF THE PREFERRED EMBODIMENT

The present invention can be exemplified but not limited by the preferred embodiments as described hereinafter.

Figure 2:
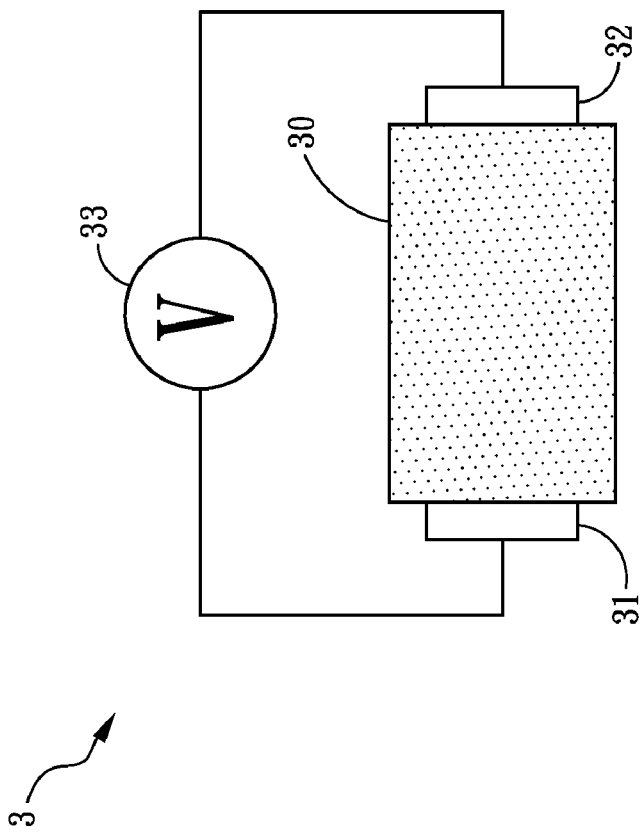
FIG. 2 is a schematic diagram of a low power consumption desorption apparatus according to one embodiment of the present invention.

Please refer to FIG. 2, which is a schematic diagram of a low power consumption desorption apparatus according to one embodiment of the present invention. In the present embodiment, the desorption apparatus 3 comprises an absorbing material 30, a pair of electrodes 31 and 32 and a voltage supply 33. The absorbing material 30 is capable of absorbing volatile organic substances in the air, exemplified by, but not limited to, nitrogen or water moisture. Generally, the absorbing material is usually used in household dehumidifiers, such as rotary dehumidifier, but not limited thereto. The absorbing material can be made of porous materials such as zeolite, silicone, silica gel, active carbon, carbon nano tubes, metal organic frameworks. Moreover, the absorbing material may also be formed of non-porous materials such as dehydrogenated metal.

The pair of electrodes 31 and 32 are connected to the both ends of the absorbing material 30. The voltage supply 33 is coupled to the electrodes 31 and 32 to provide the electrodes 31 and 32 with a voltage. The voltage supply 33 provides an AC voltage or a DC voltage. Since the electrodes 31 and 32 are disposed on the two ends of the absorbing material 30, the temporary high potential dissolves the absorbed substance or combines the absorbed substance and specific metal ions to cause ion conduction. Therefore, the conduction between the absorbed substance and the absorbing material may change so that the absorbed substance is desorbed from the absorbing material. The electric current is induced due to ion hopping in the absorbing material, ion/proton transport in the ionized substance or both. As a result, the heat loss is reduced and the power consumption is reduced because there is no need to heat up the atmosphere.

In order to perform desorption only in some specific region in the absorbing material while remaining absorption in other region when the absorbing material is rotating, the electrodes are further provided with insulators to divide the electrodes into a plurality of regions. Each of the regions is isolated from one another so that only some region of the electrodes is conductive when a voltage is applied to enable the corresponding absorbing material to perform desorption while remaining absorption in other regions.

Figure 1:
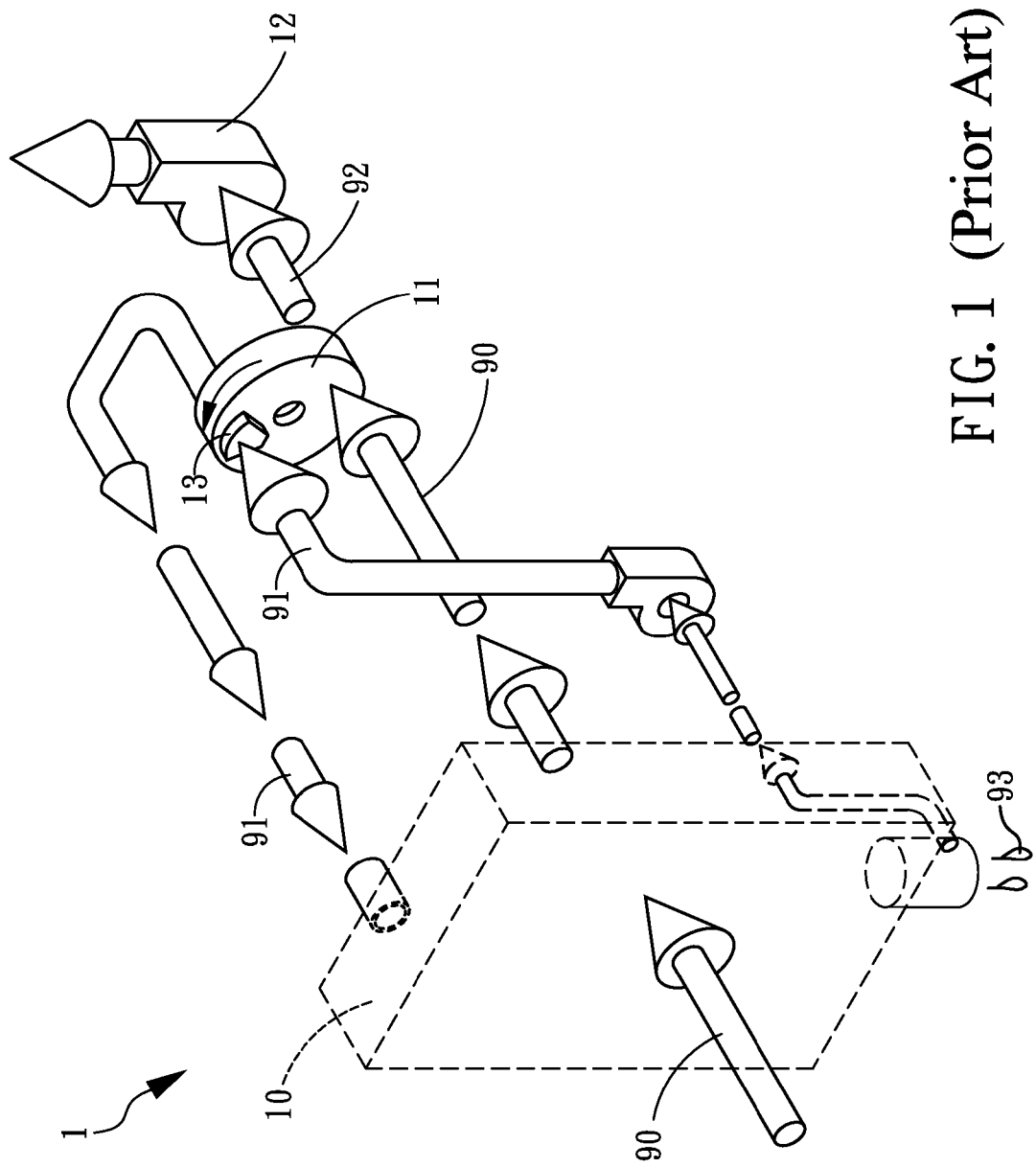
FIG. 1 is a 3-D exploded view of a conventional rotary dehumidifier.
Figure 3A:
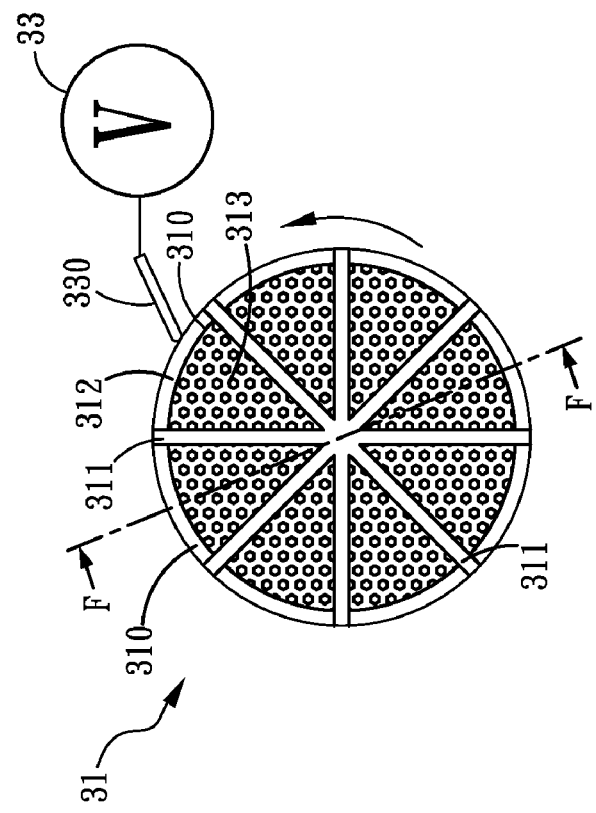
FIG. 3A is a front view of an electrode according to one embodiment of the present invention.

Please refer to FIG. 3A, which is a front view of an electrode according to one embodiment of the present invention. In the present embodiment, taking the electrode 31 for example, the electrode 31 comprises a plurality of sub-electrodes 310. Since the absorbing material of the present invention is cylindrical, each of the sub-electrodes 310 is fan-shaped. Each of the sub-electrodes 310 comprises an insulating frame 311 and a conductor 312. In the present embodiment, the insulating frame 311 is disposed on both sides of the sub-electrode 310 so that the adjacent sub-electrodes 310 are insulated from one another. The insulating frame 311 may comprise semi-friable fused alumina, ceramic, quartz, polymer, Teflon, peek, epoxy resin or combination thereof. In the present embodiment, the thickness of the insulator is within a range from 1 mm to 5 mm. The conductor 312 is disposed on the boundary of the sub-electrode 310. In the present embodiment, the conductor 312 is a metal rod or a metal wire.

In order to enhance the conductivity of the conductor 312, the conductor 312 further comprises a metal net 313 with regular or irregular pores on the surface to allow gas to flow into the absorbing material 30. The material for making the metal net 313 is not limited, as long as it comprises conductive metal. Please refer to FIG. 3B, which is a cross-sectional view of the electrode in FIG. 3A and the absorbing material according to one embodiment of the present invention. The cross-sectional view is taken along the FF direction in FIG.

Figure 3B:
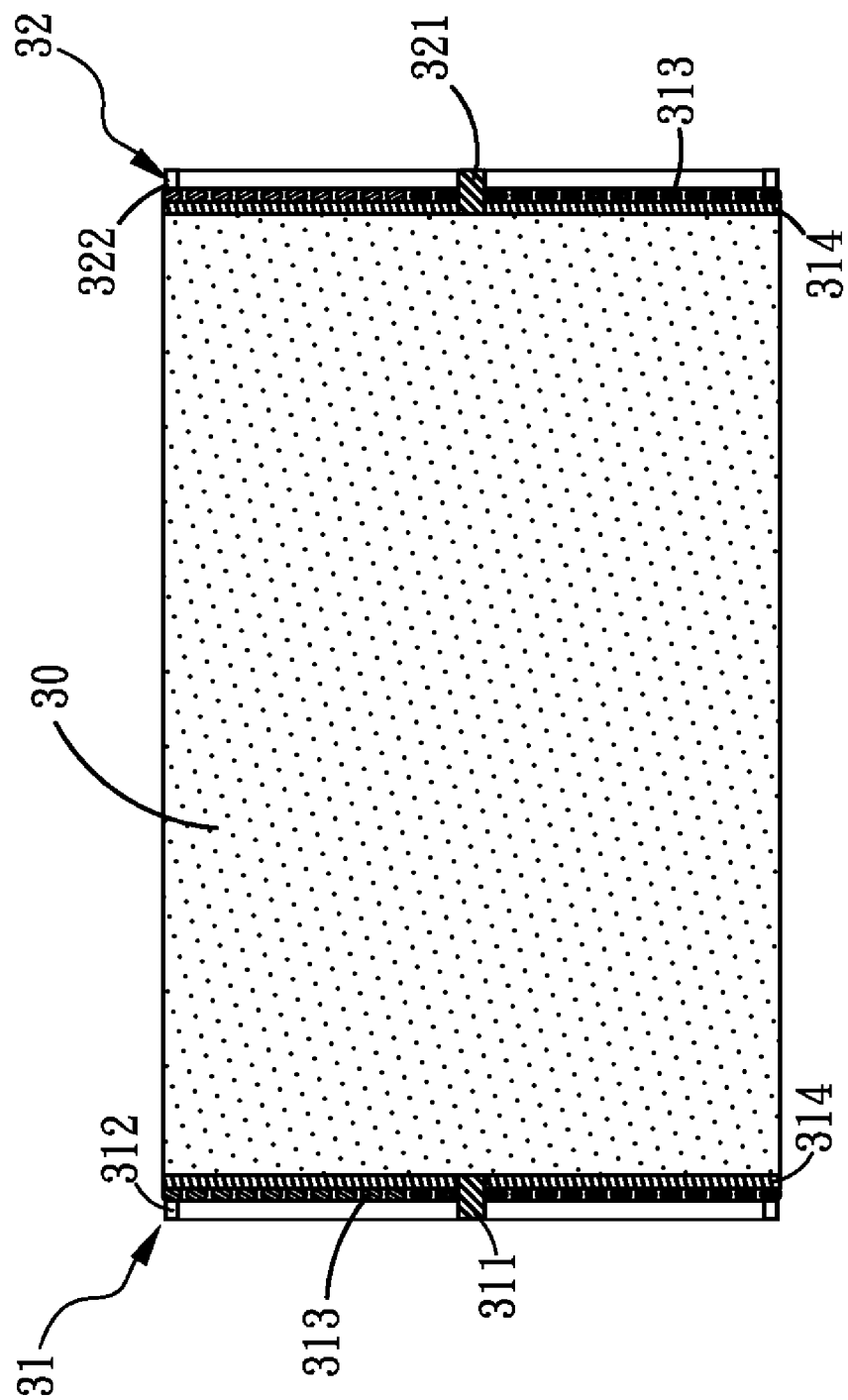
FIG. 3B is a cross-sectional view of the electrode in FIG. 3A and the absorbing material according to one embodiment of the present invention.

3A to show the electrodes, the insulating frame 311 and the absorbing material in FIG. 3B. A conductive layer 314 is further provided between the metal net 313 and the absorbing material 30 to reduce the contact resistance and uniformize the electric current. In the present embodiment, the conductive layer 314 comprises an anti-oxidation conductive material to strengthen and stabilize the circuitry between each of the sub-electrodes 310 and the absorbing material 30 to prevent abnormal discharge that may destroy the absorbing material. The conductive layer 314 may comprise a metal material such as gold (Au) and platinum (Pt), an alloy such as stainless steel or any conductive metal oxide or non-metal oxide such as indium tin oxide (ITO, $In_2O_3+SnO_2$) or a kind of carbon material such as graphite, active carbon, which can be formed by conventional techniques such as sputtering, evaporation, spray, painting or dipping. The metal net is provided so as to protect the conductive layer from being damaged.

Figure 4:
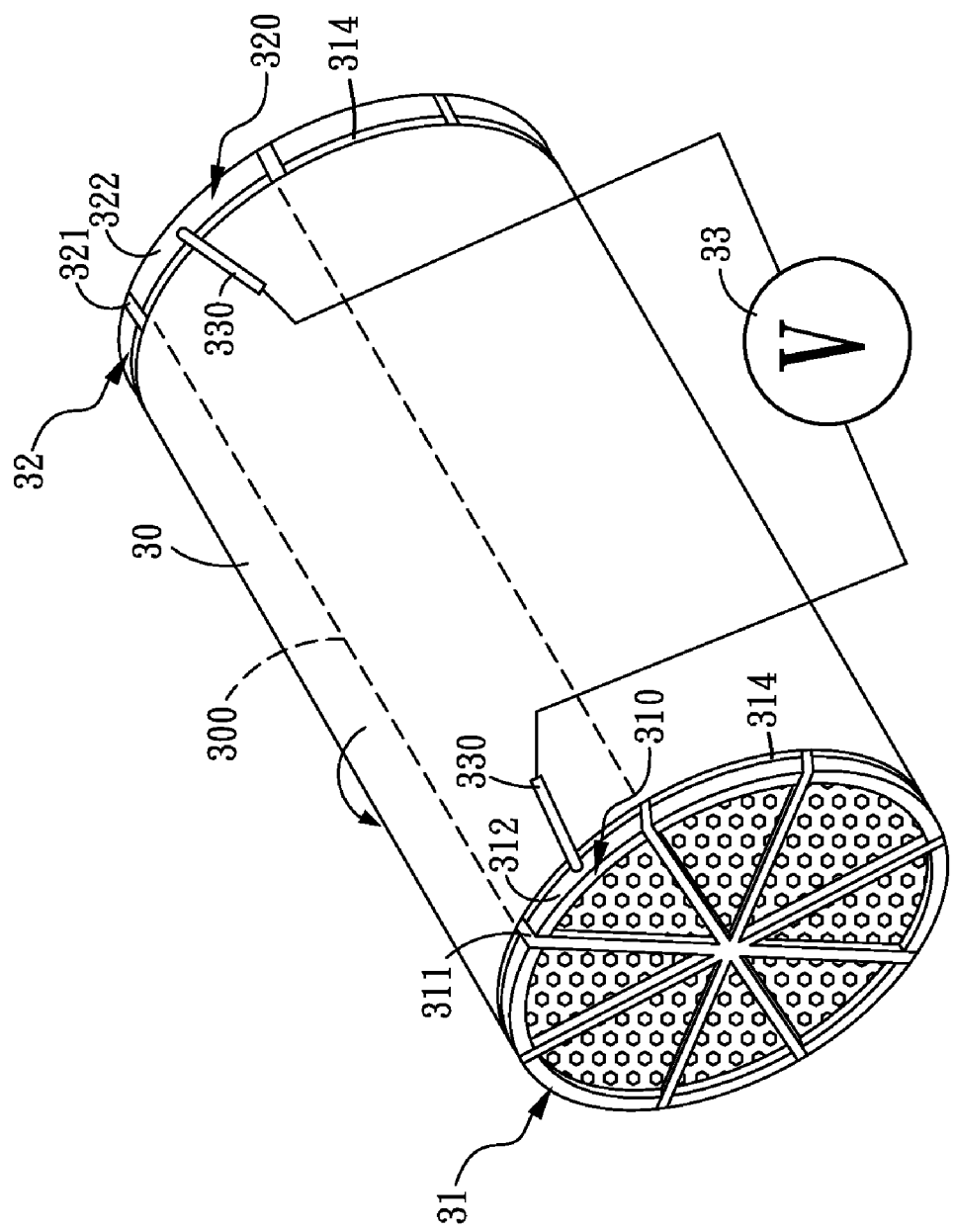
FIG. 4 is a schematic diagram showing the operation of electrodes according to one embodiment of the present invention.

Please refer to FIG. 4, which is a schematic diagram showing the operation of electrodes according to one embodiment of the present invention. Since the absorbing material of the present embodiment is capable of performing a rotational movement, the voltage supply 33 is further coupled to a brush 330 so that each of the sub-electrodes 310 can conduct an electric current independently. When the absorbing material 30 is rotating, the brush 330 is capable of being electrically connected to different sub-electrodes 310 in order. In FIG. 4, when the absorbing material 30 is rotating, the metal frame 312 that contacts the brush 330 is capable of conducting an electric current throughout all the sub-electrodes 310. Since the electrodes 31 and 32 correspond to each other, a region 300 of the absorbing material corresponding to a portion between the sub-electrodes 310 and 320 that contact the brush 330 is conductive due to an electric field between the sub-electrodes 310 and 320. Since the electrodes 31 and 32 of the present invention are provided with the insulating frames 311 and 321, desorption is only performed in the desorption region where electric conduction takes place because only the desorption region corresponds to the contact when the brush 330 contacts the metal frame 312 and 322 of the electrodes 31 and 32. On the other hand, other regions of the absorbing material 30 remain absorption. In this manner, the absorbing material 30 is capable of performing absorption and desorption at the same time.

Figure 5B:
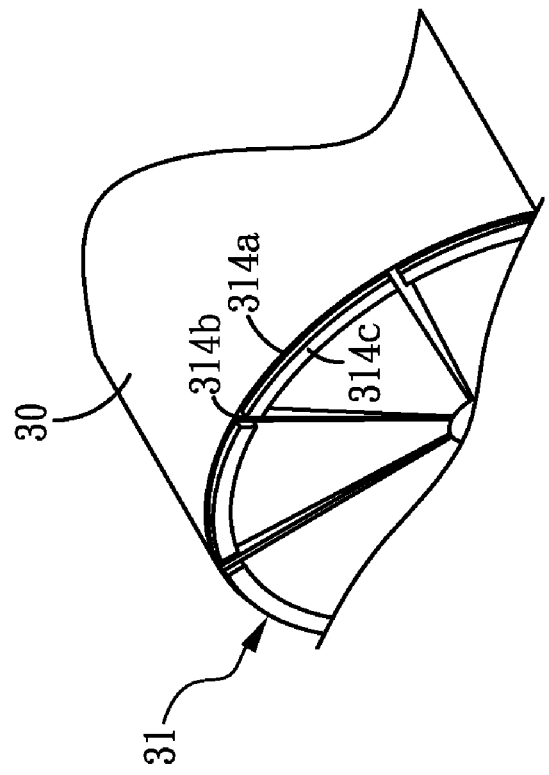
FIG. 5A and FIG. 5B are schematic diagrams of an electrode according to other embodiments of the present invention.
Figure 5A:
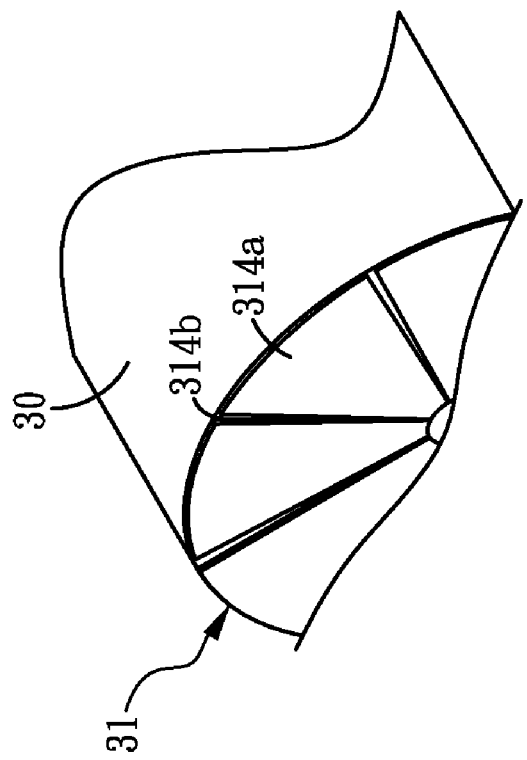

Please refer to FIG. 5A and FIG. 5B for the schematic diagrams of an electrode according to other embodiments of the present invention. In FIG. 5A, the electrode 31 may comprise an anti-oxidation conductive layer 314a capable of being coated on the surface of the absorbing material 30. With the gap 314b as an insulating portion, the electrode 31 comprises a plurality of sub-electrodes. In FIG. 5A, in addition to the gap, an insulating frame can be further disposed in the gap 314b to enhance insulation. In FIG. 5B, to enhance electric contact, a conductor 314c is further provided on the boundary of each of the sub-electrodes. The conductor 314c may be a metal rod, a metal wire or a metal net. Even though FIG. 5A and FIG. 5B show embodiments for the electrode 31, the electrode 32 may also be implemented by the same embodiments.

Figure 6:
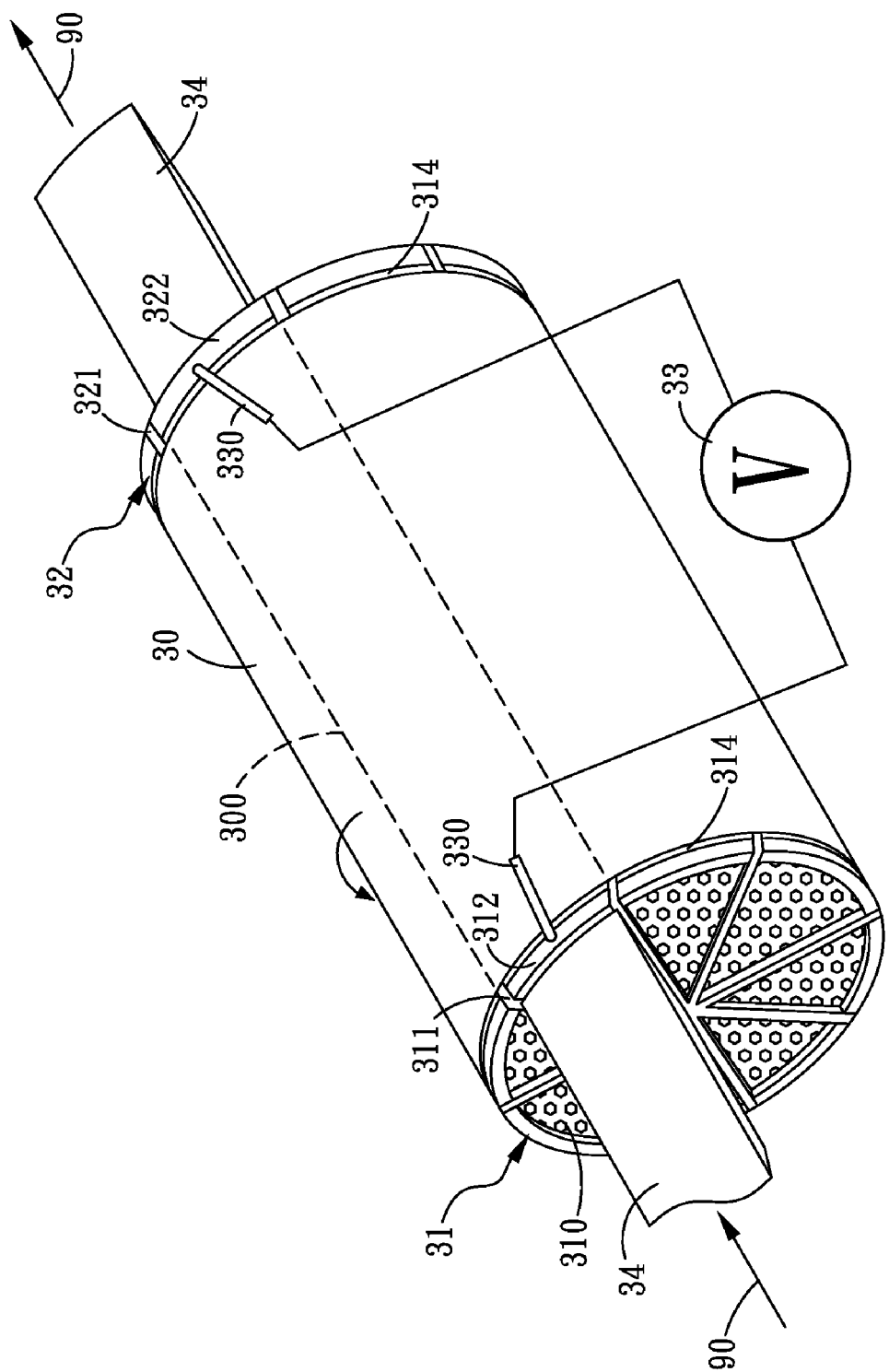
FIG. 6 is a schematic diagram showing the operation of electrodes connected to a regenerating gas path according to one embodiment of the present invention.

Referring to FIG. 6, a regenerating gas path 34 is provided on both ends of the desorption region corresponding to the brush 330. The regenerating gas path 34 is capable of introducing the gas flow 90 into the corresponding conductive desorption region and exhausting the desorbed substance to enhance the desorption rate. To further improve the desorption rate, the gas flow 90 can be heated up to a higher temperature to speed up desorption.

Figure 7:
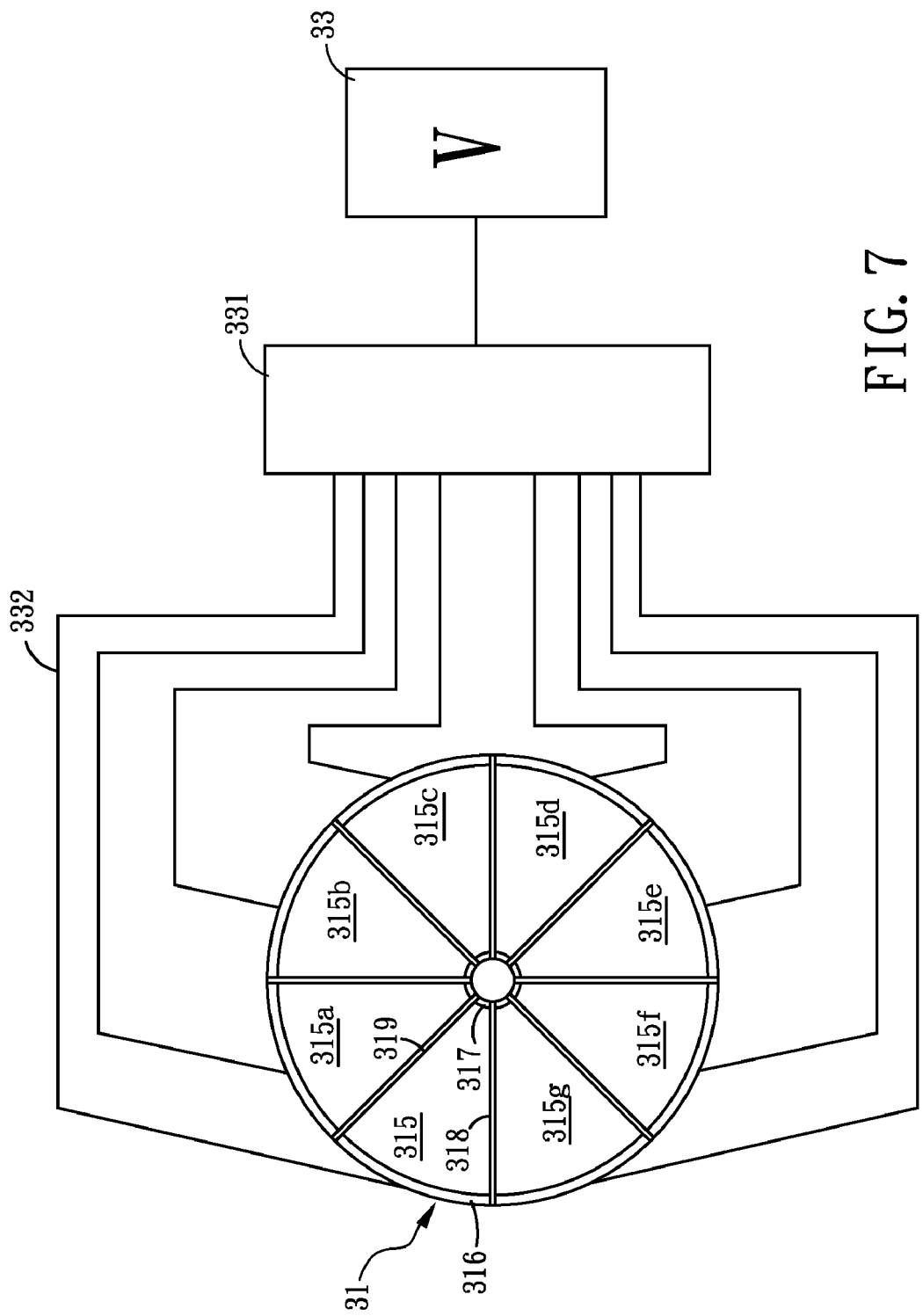
FIG. 7 is a front view of an electrode according to another embodiment of the present invention.

In the previous embodiment, the absorbing material is capable of rotating. In another embodiment, however, the absorbing material is electrically connected to the brush without rotating. Instead, each of the sub-electrodes is conducted with an electric current by power distribution control. Please refer to FIG. 7, which is a front view of an electrode according to another embodiment of the present invention. Taking the electrode 31 for example, the electrode 31 can be divided into a plurality of sub-electrodes being insulated from one another 315 and 315a to 315g, each of which comprising an external metal frame 316 and an internal metal frame 317. Insulating frames 318 and 319 are provided between the external metal frame 316 and the internal metal frame 317. A conducting wire 332 is independently introduced from each of the sub-electrodes 315 and 315a to 315g. Each of the sub-electrodes 315 and 315a to 315g can be connected to the conducting wire 332 at the external metal frame 316 or the inner metal frame 317. The conducting wire 332 corresponding to each of the sub-electrodes 315 and 315a to 315g is connected to a power distribution unit 331. The power distribution unit 331 is electrically connected to the voltage supply 33. The power distribution unit 331 is capable of receiving a positioning signal so as to provide specific sub-electrodes with power in order. For example, electricity is firstly supplied to the sub-electrode 315 on the absorbing material and then to the sub-electrode 315a to 315g in order. Such a power supplying order is equivalent to that of a rotating absorbing material. Since there are insulating frames between the sub-electrodes, it is ensured that only the specific region is conductive when the electrodes are applied with an electric current to perform desorption on the regions corresponding to the sub-electrodes, while absorption remains in the regions where the sub-electrodes are not applied with an electric current. The power distribution unit 331 comprises an arithmetic logic unit, a timer, and a power switch. The power switch can be a mechanical relay, a power distribution panel or a solid-state switch made of semiconductor. The power distribution unit of the present embodiment is conventionally known and description thereof is not repeated herein.

Figure 8A:
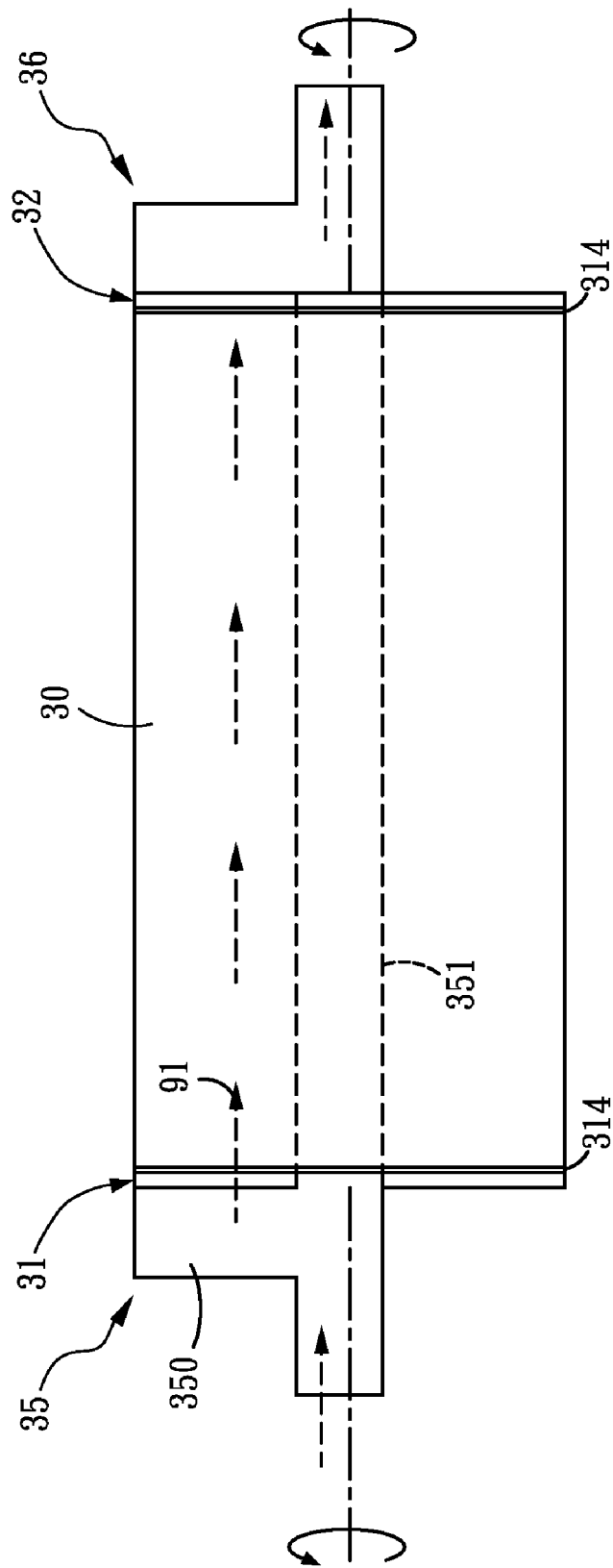
FIG. 8A to 8C are schematic diagrams of a rotating regenerating gas path according to the present invention.
Figure 8B:
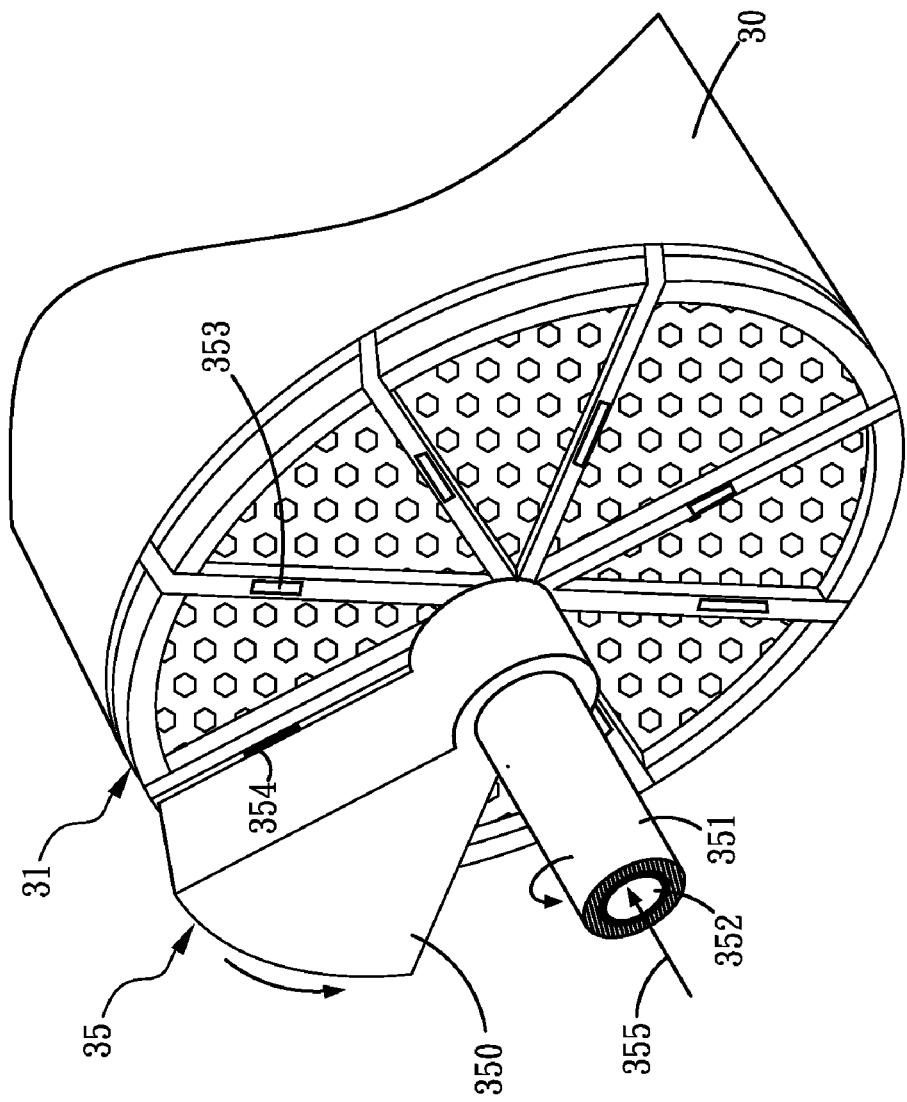
Figure 8C:
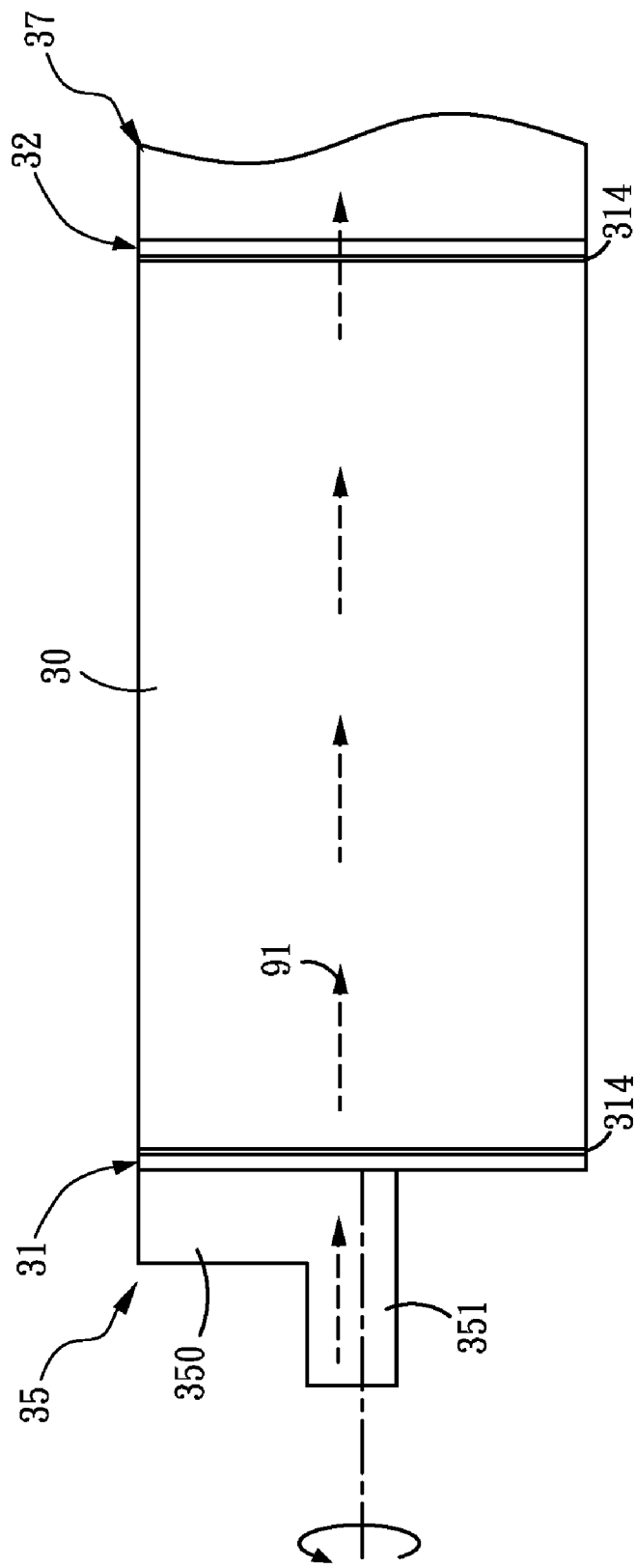

Please refer to FIG. 8A and FIG. 8B, wherein FIG. 8A is a side view of a rotational regenerating gas path of the present invention, FIG. 8B is a 3-D view of an inlet of the rotational regenerating gas path. In the present embodiment, the absorbing material 30 is still, while the regenerating gas path 35 and the gas collecting path 36 are rotating. The positions of the regenerating gas path 35 and the gas collecting path 36 are detected by a positioning sensing module. In the present embodiment, the regenerating gas path 35 and gas collecting path 36 correspond to each other and are capable of synchronously performing a rotational movement. The regenerating gas path 35 comprises a housing 350 capable of allowing a gas flow 355 to enter. The housing 350 is connected to a shaft 351, which is capable of receiving rotating power from a rotating power provider such as a motor to drive the housing 350 of the regenerating gas path to rotate. The shaft 351 further comprises a flow channel 352 capable of allowing a gas flow 355 to enter. Since the gas collecting path 36 is driven by the shaft 351 and the regenerating gas path 35 to rotate synchronously, the gas flow 355 passing through the absorbing material 30 is carried out through the gas collecting path 36. The positioning sensing module is a mechanical structure, an optical detection device, a magnetic detection device or a sonic detection device that provides replacement detection, for example, a micro switch, a photo-sensitive switch, a reed switch or a ultra-sonic sensor. In the present embodiment, the optical module comprises a light emitting device 354 disposed on the regenerating gas path 35. Another light receiving device 353 is disposed on each of the sub-electrodes. When the regenerating gas path completely covers the sub-electrodes, a positioning control signal is issued in real time to the power distribution unit. The power distribution unit stops the regenerating gas path from rotating and outputs power to the sub-electrodes that are covered for regeneration processes. The gas collecting path is not only limited as described but also can be designed as shown in FIG. 8C, where the gas collecting path 37 is not rotating and is disposed on the other side of the absorbing material 30 to collect the gas flow 355 flowing through the absorbing material.

Figure 9:
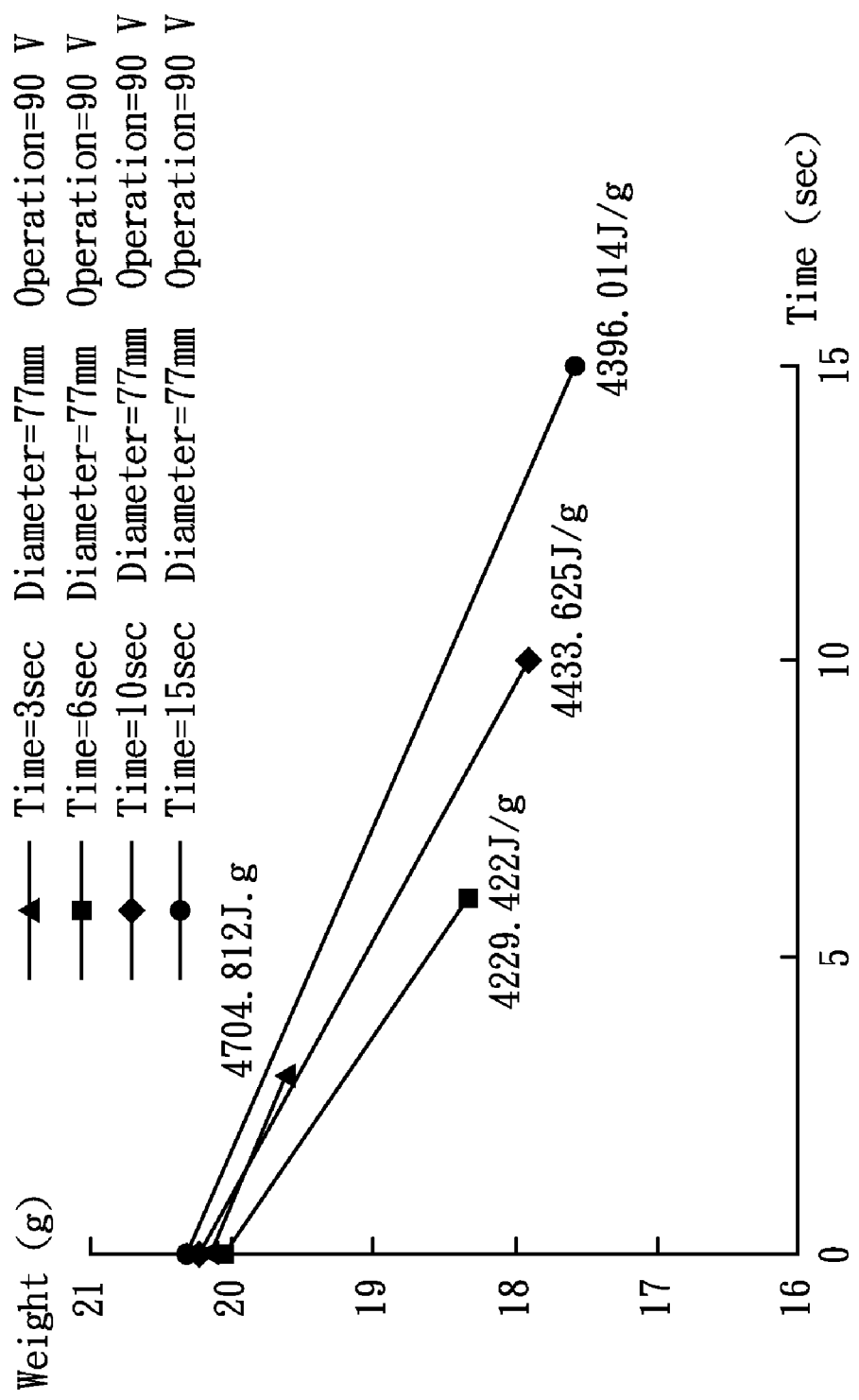
FIG. 9 shows the testing result of a dehumidifier using the electrodes and the absorbing material of the present invention.

The aforementioned desorption method can be used with any conductive absorbing material and absorbed substances in applications such as fixed-bed dehumidifiers, tower dehumidifiers and rotary dehumidifiers. FIG. 9 shows the testing result of a dehumidifier using the electrodes and the absorbing material of the present invention. In FIG. 90, the desorption capability is 6.6 liter/day (20° C., 60% RH), desorption is achieved with convection heating with power consumption of 600 watts (as shown in FIG. 9). In other words, it takes 7854 J of energy to desorb 1 gram of water. When the dehumidification wheel is not rotating and a voltage is applied across the electrodes without convection heating, the power consumption is only 4200~4700 J/g. In FIG. 9, the longitudinal axis represents the weight reduction of the dehumidification wheel, indicating the amount of desorbed water, while the traversal axis represents time. Different curves represent the results of different experiments each with different time. Each experiment is conducted at a constant voltage of 90 V. The absorbing material comprises zeolite and silicone with a diameter of 77 mm. Different desorption times result in different outcomes. In FIG. 9, ▲ denotes that the desorption time is 3 seconds; ■ denotes that the desorption time is 6 seconds; ♦ denotes that the desorption time is 10 seconds; and ● denotes that the desorption time is 15 seconds. The values shown in FIG. 9 are measured power consumption values divided by the amount of desorbed water. In FIG. 9, it is observed that optimum desorption is achieved with less power consumption when the absorbing material is applied with an electric current for 6 seconds. In other words, with the electrodes being applied with an electric current, the power consumption is 45% reduced (dropping from 7854 J/g to 4200 J/g). Even though the values in FIG. 9 are obtained when the dehumidification wheel is not rotating, this method can be used in various applications such as tower dehumidifiers and rotary dehumidifiers with different electrode designs.

Figure 10:
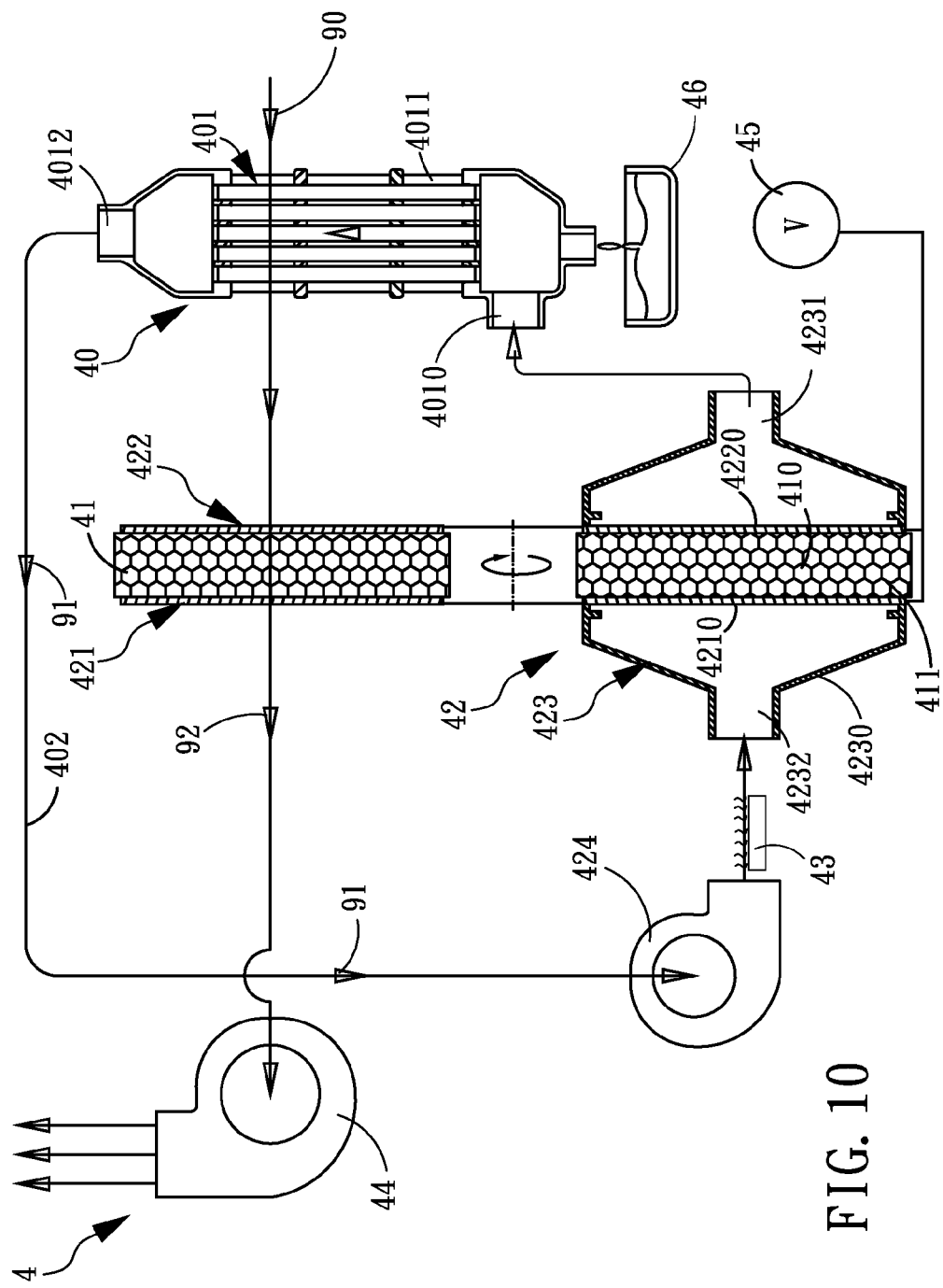
FIG. 10 is a schematic diagram of a dehumidifier according to one embodiment of the present invention.

The aforesaid desorption apparatus can be used in a dehumidifier provided in the present invention. Please refer to FIG. 10, which is a schematic diagram of a dehumidifier according to one embodiment of the present invention. The dehumidifier 4 comprises a condenser 40, an absorbing material 41 and a regenerating portion 42. The condenser 40 comprises a condenser plate 401 and a circulating pipeline 402. The condenser plate 401 comprises an inlet 4010 and an outlet 4012. In the present embodiment, the condenser plate 401 comprises a plurality of condenser pipelines 4011 comprising a flowing path for a circulating gas flow 91 to flow therein. Since the condenser plate 401 is provided to enable a gas flow 90 to be dehumidified to pass through so that a heat exchange process is performed between the gas flow 90 and the circulating gas flow 91 in the condenser plate 401, so that the moisture in the circulating gas flow in the condenser plate 401 is condensed into water to be collected in a water collector 46. There are interstices between the condenser pipelines 4011 to enable the gas flow 90 to pass through. The condenser plate 401 is well-known to those with ordinary skills in the art, and thus the description thereof is not presented. The regenerating portion 42 is coupled to the absorbing material 41. The regenerating portion 42 comprises a pair of electrodes 421 and 422, a regenerating gas path 423 and a regenerating blower 424. The pair of electrodes 421 and 422 are coupled similarly to the foresaid electrode 31 and 32, and thus description thereof is not repeated. The regenerating gas path 423 comprises a housing 4230 as a gas flow channel. On one side of the housing 4230 is provided an outlet 4231 channeled with the inlet 4010 of the condenser plate 401. On the other side of the housing 4231 is provided an inlet 4232 channeled with the regenerating blower 424. The regenerating blower 424 is capable of increasing the pressure of the circulating gas flow 91 to accelerate the circulating gas flow 91.

The absorbing material 41 is capable of allowing the gas flow 90 to pass through. The absorbing material 41 comprises micro-structures 410 therein to absorb moisture in the gas flow 90. In the present embodiment, the absorbing material 41 is a roller capable of rotating. Certainly, the absorbing material 41 is not restricted to a roller in the present invention. The absorbing material 41 is well-known to those with ordinary skills in the art, and thus the description thereof is not presented.

As the absorbing material 41 rotates to a fixed position, the sub-electrodes 4210 and 4220 corresponding to the regenerating gas path 42 can be coupled to the voltage supply 45. Therefore, the electric current helps to desorb the substance absorbed in the absorbing material 411 corresponding to the sub-electrodes 4210 and 4220. In the present embodiment, the regenerating portion 22 comprises a housing 4230 capable of allowing the circulating gas flow 91 to pass through. The housing 4230 covers part of the absorbing material 41, so that the circulating gas flow 91 in the housing 4230 passes through the absorbing material 41 to carry out the desorbed substance in the absorbing material 21 after an electric current is applied.

In order to accelerate the dehumidified gas flow 90 to better control dehumidification, the present embodiment further provides a dehumidifying blower 44 capable of exhausting the dehumidified gas flow 92 passing through the absorbing material 41 out of the dehumidifier 4. Moreover, the dehumidifier 4 further comprises a heating unit 43. In the present embodiment, the heating unit 43 is disposed between the inlet 4232 of the regenerating portion 42 and the regenerating blower 424. The heating unit 43 is capable of providing the circulating gas flow 91 with thermal energy to increase the temperature of the circulating gas flow 91 to further enhance condensation of the desorbed moisture.

Accordingly, the present invention discloses a low power consumption desorption apparatus and a dehumidifier using the method, wherein a voltage is applied across electrodes on both ends of a conductive material for desorption. Therefore, the present invention is useful, novel and non-obvious.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A low power consumption desorption apparatus, comprising: an absorbing material capable of absorbing at least a substance; a pair of electrodes coupled to both ends of the absorbing material, each of the electrodes comprising a plurality of sub-electrodes being insulated from one another; and a voltage supply coupled to the pair of electrodes and providing the pair of electrodes with a voltage so that the absorbing material is conductive to perform desorption; wherein each of the electrodes further comprises: a conductor coupled to the absorbing material; and a plurality of insulating frames disposed on the conductor to divide the conductor into the plurality of sub-electrodes being insulated from one another.

2. The low power consumption desorption apparatus as recited in claim 1, further comprising a regenerating gas path capable of providing a gas flow through the absorbing material to carry the substance desorbed out from the absorbing material.

3. The low power consumption desorption apparatus as recited in claim 2, wherein the absorbing material does not rotate and the regenerating gas path performs a rotational movement.

4. The low power consumption desorption apparatus as recited in claim 3, wherein a conducting wire is introduced from each of the sub-electrodes on each of the electrodes so that each of the sub-electrodes is connected to a power distribution unit by way of the conducting wire when the absorbing material is not rotating.

5. The low power consumption desorption apparatus as recited in claim 2, wherein the regenerating gas path does not rotate and the absorbing material performs a rotational movement.

6. The low power consumption desorption apparatus as recited in claim 5, wherein each of the electrodes is further coupled to a brush when the absorbing material is performing the rotational movement.

7. The low power consumption desorption apparatus as recited in claim 2, wherein the gas flow has been heated up.

8. The low power consumption desorption apparatus as recited in claim 1, wherein the voltage is an alternate current (AC) voltage or a direct current (DC) voltage.

9. The low power consumption desorption apparatus as recited in claim 1, wherein each of the sub-electrodes is a conductive layer formed on one surface of the absorbing material.

10. The low power consumption desorption apparatus as recited in claim 9, wherein the conductive layer comprises a carbon material, a metal material, an alloy, a metal oxide or a non-metal oxide.

11. The low power consumption desorption apparatus as recited in claim 1, further comprising a conductive layer between the each of the sub-electrodes and the absorbing material.

12. The low power consumption desorption apparatus as recited in claim 11, wherein the conductive layer comprises a carbon material, a metal material, an alloy, a metal oxide or a non-metal oxide.

13. The low power consumption desorption apparatus as recited in claim 1, wherein the conductor is a metal net, a metal rod or a metal wire.

14. The low power consumption desorption apparatus as recited in claim 1, wherein the voltage supply further comprises a power distribution unit electrically connected to the plurality of sub-electrodes.

15. The low power consumption desorption apparatus as recited in claim 1, wherein the absorbing material performs a rotational movement.

16. The low power consumption desorption apparatus as recited in claim 1, wherein the absorbing material is made of porous materials such as zeolite, silicone, active carbon, carbon nano tubes, molecular sieves or metal organic frameworks or non-porous materials such as dehydrogenated metal.

17. The low power consumption desorption apparatus as recited in claim 1, wherein the absorbing material is conductive or capable of conducting after absorbing the substance.

18. A dehumidifier, comprising: a condenser capable of providing a circulating gas flow; an absorbing material capable of allowing a gas flow to pass through to absorb at least a substance in the gas flow; a regenerating portion coupled to the condenser and the absorbing material, the regenerating portion guiding the circulating gas flow to pass through the absorbing material and further comprising a pair of electrodes coupled to both ends of the absorbing material, each of the electrodes comprising a plurality of sub-electrodes being insulated from one another; a voltage supply coupled to the pair of electrodes and providing the pair of electrodes with a voltage so that the absorbing material is conductive to perform desorption; wherein each of the electrodes further comprises: a conductor coupled to the absorbing material; and a plurality of insulating frames disposed on the conductor to divide the conductor into the plurality of sub-electrodes being insulated from one another.

19. The dehumidifier as recited in claim 18, wherein the regenerating portion further comprises a regenerating gas path capable of providing the gas flow through the absorbing material to carry the substance desorbed out from the absorbing material.

20. The dehumidifier as recited in claim 19, wherein the regenerating gas path performs a rotational movement.

21. The dehumidifier as recited in claim 19, wherein the regenerating portion further comprises a heating unit capable of heating up the circulating gas flow.

22. The dehumidifier as recited in claim 18, wherein the voltage is an alternate current (AC) voltage or a direct current (DC) voltage.

23. The dehumidifier as recited in claim 18, wherein each of the sub-electrodes is a conductive layer formed on one surface of the absorbing material.

24. The dehumidifier as recited in claim 23, wherein the conductive layer comprises a metal material, an alloy, a metal oxide or a non-metal oxide.

25. The dehumidifier as recited in claim 18, further comprising a conductive layer between the each of the sub-electrodes and the absorbing material.

26. The dehumidifier as recited in claim 25, wherein the conductive layer comprises a metal material, an alloy, a metal oxide or a non-metal oxide.

27. The dehumidifier as recited in claim 18, wherein the conductor is a metal net, a metal rod or a metal wire.

28. The dehumidifier as recited in claim 18, wherein the voltage supply further comprises a power distribution unit electrically connected to the plurality of sub-electrodes.

29. The dehumidifier as recited in claim 18, wherein the absorbing material performs a rotational movement.

30. The dehumidifier as recited in claim 18, wherein the condenser comprises a condenser plate comprising a plurality of condenser pipelines.

31. The dehumidifier as recited in claim 18, wherein the absorbing material is made of porous materials such as zeolite, silicone, active carbon, carbon nano tubes, molecular sieves or metal organic frameworks or non-porous materials such as dehydrogenated metal.

32. The dehumidifier as recited in claim 18, wherein the absorbing material is conductive or capable of conducting after absorbing the substance.

* * * * *